United States Patent
Zhou et al.

(10) Patent No.: US 12,481,033 B1
(45) Date of Patent: Nov. 25, 2025

(54) LASER SCANNING DEVICE OF UAV-BORNE LIDAR FOR WATER DEPTH MEASUREMENT, LIDAR, AND UAV

(71) Applicant: GUILIN UNIVERSITY OF TECHNOLOGY, Guilin (CN)

(72) Inventors: Guoqing Zhou, Guilin (CN); Jianyin Liu, Guilin (CN); Xueqin Nong, Guilin (CN)

(73) Assignee: GUILIN UNIVERSITY OF TECHNOLOGY, Guilin (CN)

( * ) Notice: Subject to any disclaimer, the term of this patent is extended or adjusted under 35 U.S.C. 154(b) by 0 days.

(21) Appl. No.: 18/980,397

(22) Filed: Dec. 13, 2024

(30) Foreign Application Priority Data

Oct. 9, 2024 (CN) .......................... 202411396461.5

(51) Int. Cl.
  *G01S 7/48* (2006.01)
  *G01S 7/481* (2006.01)
(52) U.S. Cl.
  CPC .......... *G01S 7/4817* (2013.01); *G01S 7/4816* (2013.01)
(58) Field of Classification Search
  USPC ................................................ 356/4.01, 5.01
  See application file for complete search history.

(56) References Cited

U.S. PATENT DOCUMENTS

| 10,444,356 | B2 * | 10/2019 | Wu | G02B 26/10 |
| 2016/0291136 | A1 * | 10/2016 | Lindskog | G01S 7/4817 |
| 2020/0284883 | A1 * | 9/2020 | Ferreira | G01S 7/4815 |
| 2021/0364603 | A1 * | 11/2021 | Kim | G01S 7/4815 |
| 2022/0146635 | A1 * | 5/2022 | Wei | G02B 3/0037 |
| 2022/0397647 | A1 * | 12/2022 | Goren | G01S 7/4815 |
| 2023/0064401 | A1 * | 3/2023 | Heinzle | G01S 17/933 |
| 2024/0264313 | A1 * | 8/2024 | Eshel | G01S 7/4815 |

FOREIGN PATENT DOCUMENTS

| CN | 119270236 | B | | 6/2025 | | |
| KR | 20210144546 | A | * | 11/2021 | ............... | G02B 5/20 |
| KR | 20220059464 | A | * | 5/2022 | ............... | G02B 5/20 |
| WO | WO-2021040250 | A1 | * | 3/2021 | ............. | H01S 5/423 |

OTHER PUBLICATIONS

Office Action from CN 202411396461.5 dated Mar. 4, 2025. (7 pages).
Notification to Grant Patent Rights for Invention from CN 202411396461.5 dated Apr. 14, 2025 (3 pages).

* cited by examiner

*Primary Examiner* — James R Hulka
(74) *Attorney, Agent, or Firm* — Tutunjian & Bitetto, P.C.

(57) ABSTRACT

A laser scanning device of an UAV-borne LiDAR for water depth measurement, LiDAR, and an UAV are provided. In the laser scanning device, through synchronous driving of two motors, when the incident laser beam completes a 360° light spot scanning process by the rotation of a light-plane reflecting rotating mirror, and a scanning beam is in position ranges of 0°-X° and (360-X)°-360°, a photodetector protection assembly just rotates to an area with a light attenuation value of 0, or an occlusion-free area. Light echoes generated by the scanning beams in the ranges enter a photodetector without attenuation, while the scanning beam in the range of X°-(360-X)° is occluded by a notched circular shield, and stray light generated by the occlusion cannot enter the photodetector due to attenuation of a circular light attenuation sheet or occlusion of an unnotched part of the circular blocking sheet.

17 Claims, 3 Drawing Sheets

LASER SCANNING DEVICE OF UAV-BORNE LIDAR FOR WATER DEPTH MEASUREMENT, LIDAR, AND UAV

CROSS-REFERENCE TO RELATED APPLICATION

This patent application claims the benefit and priority of Chinese Patent Application No. 2024113964615 filed with the China National Intellectual Property Administration on Oct. 9, 2024, the disclosure of which is incorporated by reference herein in its entirety as part of the present application.

TECHNICAL FIELD

The present disclosure relates to the technical field of LiDAR detection, and in particular to a laser scanning device of an unmanned aerial vehicle (UAV)-borne Light Laser detection and ranging (LiDAR) for water depth measurement, the LiDAR, and an UAV.

BACKGROUND

Laser scanning device is one of the most important assemblies of LiDAR (Light Laser detection and ranging), which has the function of using a pulsed laser beam to perform two-dimensional deflection scanning of a light spot, deflection scanning of an optical linear array, or deflection scanning of an optical area array on a detection target area. At present, LiDAR products on the market are usually used in the fields of automatic driving, three-dimensional mapping on the ground, automatic production, etc. The scanning modes of the laser scanning devices of the LiDAR products include the following four types: the first is the two-dimensional scanning of combined light spots such as a galvanometer mirror, a polygon mirror or an optical wedge, the second is the 360° light spot scanning of a light reflecting rotating mirror, the third is the large-field scanning of an optical linear array, and the fourth is the large-field scanning of an optical area array. However, the laser scanning devices of these products are often not suitable for water-bottom measurement environment, this is because the diffuse reflectance of light from the water bottom is less than 0.1% compared with a situation that the diffuse reflectance of a ground object is greater than 10%, and the water body has large light absorption and light scattering, which makes the measurement accuracy unable to meet the work requirements. Therefore, there is an urgent need of a LiDAR laser scanning product suitable for a water-bottom measurement environment.

SUMMARY

For the problems in the prior art, an objective of the present disclosure is to provide a laser scanning device of an UAV-borne LiDAR for water depth measurement, the LiDAR, and the UAV, thus improving the accuracy of water depth measurement and reducing the complexity of the device.

To achieve the objective above, the present disclosure employs the following technical solutions.

In a first aspect, the present disclosure provides a laser scanning device of an UAV-borne LiDAR for water depth measurement, including a laser, a light scanning assembly, a light receiving assembly, and a photodetector. The light scanning assembly includes a light-plane reflecting rotating mirror, a first motor, and a notched annular shield. The light receiving assembly includes a light-plane reflecting mirror with a central opening, a primary light receiving lens, a photodetector protection assembly, a second motor, a light collimator, and a light converging lens. The photodetector protection assembly is a circular light attenuation sheet, or a notched circular blocking sheet.

The laser is configured to emit a laser beam, and a direction of the laser beam emitted is parallel to a flight direction of the UAV. The light-plane reflecting mirror with the central opening and the light-plane reflecting rotating mirror are located on an emitting light path of the laser in turn and placed at a predetermined included angle with respect to an optical axis of an incident laser beam. The laser beam emitted by the laser passes through the central opening of the light-plane reflecting mirror with the central opening, is directly incident on the light-plane reflecting rotating mirror, and is reflected downward by the light-plane reflecting rotating mirror to form scanning beams. An XYZ coordinate system is established with the flight direction of the UAV as a Y-axis direction and a horizontal plane as an X-Y plane, and a position where the scanning beams are parallel to a Z axis is used as a 0° rotation position.

The light-plane reflecting rotating mirror is driven by the first motor to rotate clockwise or counterclockwise by 360° around the optical axis of the incident laser beam based on 0° rotation position, such that the incident laser beam forms 360° spot linear scanning in an X-Z plane; the notched annular shield is mounted around the light-plane reflecting rotating mirror, the notched annular shield is arranged with a notch being downwards and the notch has area ranges of 0°-X° and (360-X)°-360°; the notched annular shield is configured to occlude scanning beams in a position range of X°-(360-X) °, and only scanning beams in position ranges of 0°-X° and (360-X)°-360° pass downwards through the notch of the notched annular shield to form an in-line linear scanning trajectory, wherein X is greater than or equal to 5 and less than or equal to 25.

The scanning beams outgoing through the notch of the notched annular shield reaches a water surface downwards, and part of the scanning beams passes through a water body to reach a water bottom. Light echoes reflected from the water surface and the water bottom are transmitted upward to the light-plane reflecting rotating mirror, reflected by the light-plane reflecting rotating mirror to the light-plane reflecting mirror with the central opening, and then reflected by the light-plane reflecting mirror with the central opening.

The primary light receiving lens, the photodetector protection assembly, the light collimator, the light converging lens and the photodetector are arranged on a reflecting light path of the light-plane reflecting mirror with the central opening in turn. A light echo reflected by the light-plane reflecting mirror with the central opening enters the primary light receiving lens, and enters the photodetector through the light collimator and the light converging lens after being attenuated or occluded by the photodetector protection assembly. The photodetector protection assembly is driven by the second motor, and the second motor and the first motor are synchronously driven, such that the photodetector protection assembly also just rotate to an area with a light attenuation value of 0 or an occlusion-free area when the scanning beams are in the position ranges of 0°-X° and (360-X)°-360°, and the scanning beams in the position range of X°-(360-X) ° are occluded by the notched annular shield, and stray light generated by occlusion is unable enter the photodetector due to attenuation or occlusion of the photodetector protection assembly.

In some embodiments, the predetermined included angle between the light-plane reflecting mirror with the central opening as well as the light-plane reflecting rotating mirror and the optical axis of the incident laser beam is 45°.

In some embodiments, the light-plane reflecting rotating mirror is circular.

In some embodiments, the first motor is coaxial with the incident laser beam.

In some embodiments, the second motor and the first motor are configured to drive the photodetector protection assembly and the light-plane reflecting rotating mirror respectively to synchronously rotate in the same direction.

In some embodiments, in the circular light attenuation sheet, areas corresponding to the position ranges of 0°-X° and (360-X)°-360° of the scanning beams are zero value light attenuation areas in which the light attenuation value is 0; and an area corresponding to the position range of X°-(360-X) ° of the scanning beams is a high value light attenuation area, in which the light attenuation value is 60 dB.

In some embodiments, in the notched circular blocking sheet, areas corresponding to the position ranges of 0°-X° and (360-X)°-360° of the scanning beams are occlusion-free areas, and an area corresponding to the position range of X°-(360-X) ° of the scanning beam is occluded by the notched circular blocking sheet.

In some embodiments, the notched circular blocking sheet employs a notched circular metal extinction sheet.

In a second aspect, the present disclosure provides an UAV-borne LiDAR for water depth measurement, including a controller, and the laser scanning device. The controller is connected to a laser, a first motor, a second motor, and a photodetector in the laser scanning device. The controller is configured to control optical power of a laser beam emitted by the laser, and to drive the first motor and the second motor to move synchronously. The controller is further configured to record reference time when the laser beam is emitted and return time of light echoes from a water surface and a water bottom, and to calculate a depth of a water body according to the reference time and the return time.

In a third aspect, the present disclosure provides an UAV. An UAV-borne LiDAR for water depth measurement is borne on the UAV.

According to specific embodiments of the present disclosure, the present disclosure has the following technical effects.

The present disclosure provides a laser scanning device of an UAV-borne LiDAR for water depth measurement, the LiDAR, and the UAV. Based on a structural arrangement of a light scanning assembly and a light receiving assembly in the laser scanning device, two motors are configured to drive a photodetector protection assembly and a light-plane reflecting rotating mirror to rotate synchronously, such that when the incident laser beam completes a 360° light spot scanning process by the rotation of the light-plane reflecting rotating mirror, and a scanning beam is in position ranges of 0°-X° and (360-X)°-360°, the photodetector protection assembly also just rotates to an area with a light attenuation value of 0, or an occlusion-free area, and a light echo (water surface and water bottom) generated by the scanning beam in the ranges enters a photodetector without attenuation, while the scanning beam in the range of X°-(360-X) ° is occluded by a notched circular shield, and stray light generated by the occlusion cannot enter the photodetector due to attenuation of a circular light attenuation sheet or occlusion of an unnotched part of the circular blocking sheet. The laser scanning device, by employing a mode of synchronous optical scanning of double motors and light attenuation (or light occlusion), can eliminate the interference and damage of shield light, stray light and other light echoes that are not from the water bottom on the photodetector as much as possible, which greatly improve the detection accuracy, and is particularly suitable for water depth measurement. Moreover, the structural design of the light scanning assembly and the light receiving assembly can reduce the overall weight, volume and complexity of the laser scanning device, which is beneficial to the lightweight and miniaturization of the whole LiDAR machine, and convenient for the selection, use and operation of the borne UAV platform.

BRIEF DESCRIPTION OF THE DRAWINGS

To describe the technical solutions of the present disclosure more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the scope of protection of the present disclosure.

In order to make the objectives, features and advantages of the present disclosure more clearly, the present disclosure is further described in detail below with reference to the accompanying drawings and specific embodiments.

Figure 1:
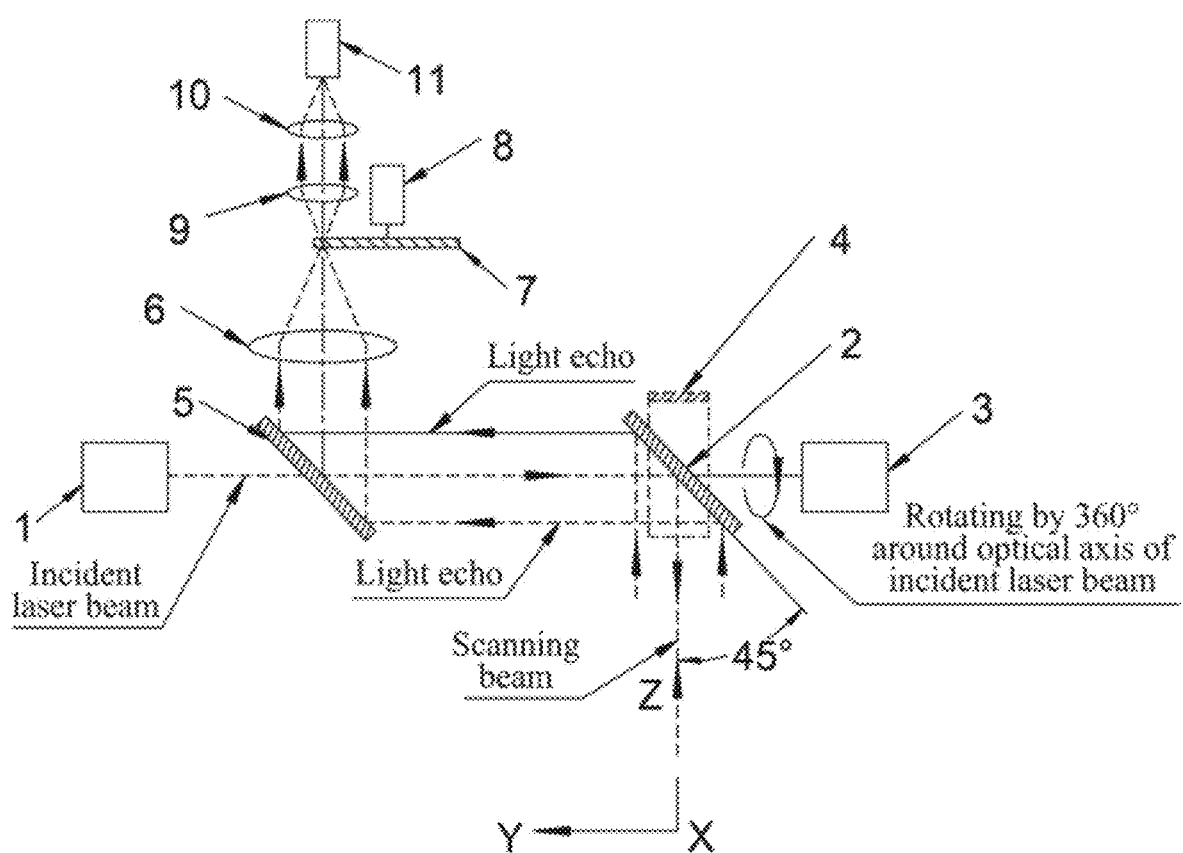
FIG. 1 is a schematic diagram of an overall structure of a laser scanning device of an UAV-borne LiDAR for water depth measurement according to the present disclosure.

In an exemplary embodiment, the present disclosure provides a laser scanning device of an UAV-borne LiDAR for water depth measurement. As shown in FIG. 1, the laser scanning device includes a laser 1, a light scanning assembly, a light receiving assembly, and a photodetector 11. The light scanning assembly includes a light-plane reflecting rotating mirror 2, a first motor 3, and a notched annular shield 4. The light receiving assembly includes a light-plane reflecting mirror 5 with a central opening, a primary light receiving lens 6, a photodetector protection assembly 7, a second motor 8, a light collimator 9, and a light converging lens 10. The photodetector protection assembly 7 may be a circular light attenuation sheet, or a notched circular blocking sheet.

As shown in FIG. 1, the laser 1 is configured to emit a pulsed laser beam (laser beam for short), and a direction of the laser beam emitted is parallel to a flight direction (Y-axis direction) of the UAV. The light-plane reflecting mirror 5 with a central hole and the light-plane reflecting rotating mirror 2 are located on an emitting light path of the laser 1 in turn, and are placed at a predetermined included angle with an optical axis of the incident laser beam. In an embodiment shown in FIG. 1, the predetermined included angle is 45°, the light-plane reflecting rotating mirror 2 is generally a circular light-plane reflecting rotating mirror. The laser beam emitted by the laser 1 passes through the central opening of the light-plane reflecting mirror 5 with a central opening, is directly incident on the light-plane reflecting rotating mirror 2, and is reflected by the light-plane reflecting rotating mirror 2 to form a scanning beam downwards. In an embodiment of the present disclosure, an XYZ coordinate system is established with the flight direction (i.e., an optical axis direction of the incident laser beam) of the UAV as a Y-axis direction and a horizontal plane as an X-Y plane, and a position that the scanning beams are parallel to a Z axis is used as a 0° rotation position.

Figure 2A:
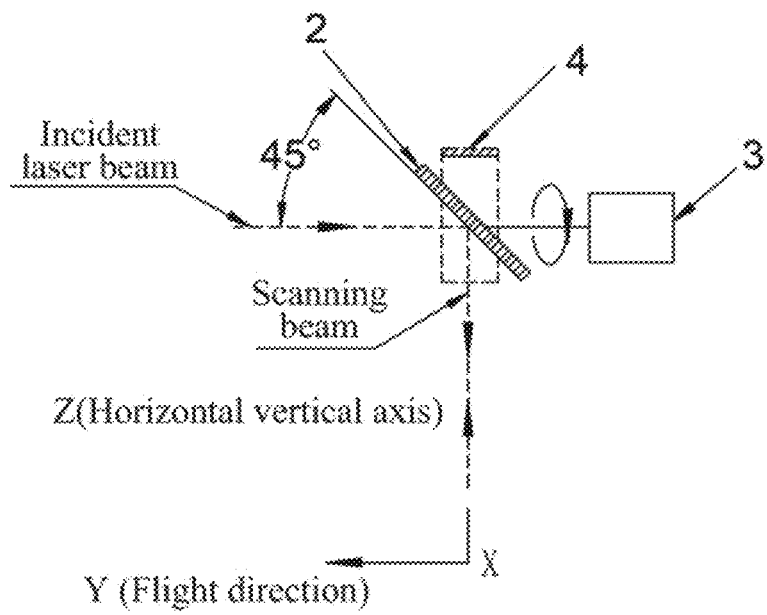
FIG. 2A is a structural diagram of a light scanning assembly according to the present disclosure.
Figure 2B:
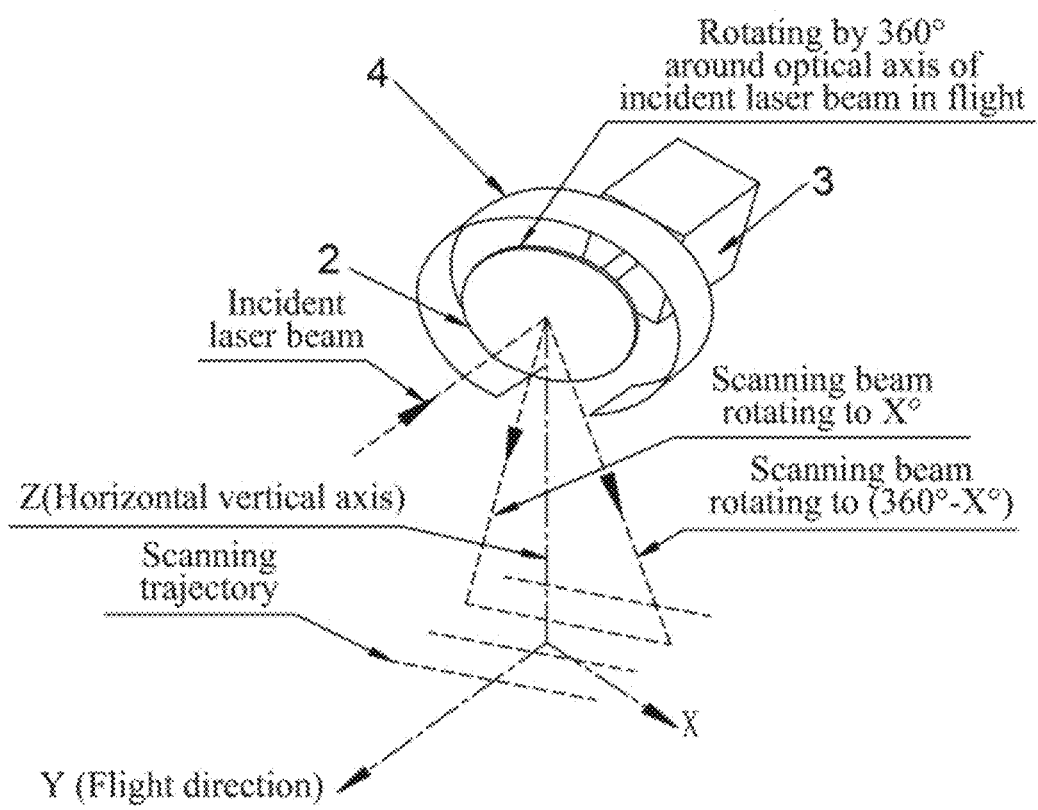
FIG. 2B is another structural diagram of a light scanning assembly according to the present disclosure.

A structure of the light scanning assembly is specifically shown in FIGS. 2A-2B, FIG. 2A shows a scanning beam at 0° rotation position, which is a sectional diagram of a structure of the light scanning assembly, and FIG. 2B shows scanning beams when rotated to X° and (360-X°) positions, which is a schematic diagram of a three-dimensional structure of the light scanning assembly, where X is greater than or equal to 5 and less than or equal to 25 (i.e. 5<X≤25). Referring to FIGS. 2A-2B, the incident laser beam parallel to the Y-axis direction (flight direction) is reflected by the circular light-plane reflecting rotating mirror 2 to form a scanning beam vertically downward along the Z axis (assuming this position is 0° position). An included angle between the circular light-plane reflecting rotating mirror 2 and the incident laser beam is 45°. The first motor 3 is coaxial with the incident laser beam. The light-plane reflecting rotating mirror 2 is driven by the first motor 3 to rotate by 360° clockwise or counterclockwise around an optical axis of the incident laser beam based on 0° position, such that the incident laser beam forms 360° light spot linear scanning in the X-Z plane. A notched annular shield 4 is mounted around the light-plane reflecting rotating mirror 2, and the notched annular shield 4 is arranged with a notch being downwards and the notch has area ranges of 0°-X° and (360-X) °-360°. The notched annular shield may be configured to occlude a scanning beam in the position range of X°-(360-X) °, and only scanning beams in the 0°-X° and the position range of (360-X)°-360° form pass downwards through the notch of the notched annular shield 4 to form an in-line linear scanning trajectory. When the LiDAR flies in the Y-axis direction, a light spot linear scanning trajectory in the X-Y plane will become an inclined in-line linear scanning trajectory array with left backward and right forward (relative to the flight direction), as shown in FIG. 2B.

Referring to FIG. 1 and FIGS. 2A-2B, the scanning beams outgoing through the notch of the notched annular shield 4 reach a water surface downwards, and part of the scanning beams passes through a water body to reach a water bottom. Light echoes reflected from the water surface and the water bottom are transmitted upward to the light-plane reflecting rotating mirror 2, reflected by the light-plane reflecting rotating mirror 2 to the light-plane reflecting mirror 5 with a central opening, and then reflected by the light-plane reflecting mirror 5 with a central opening.

As shown in FIGS. 2A-2B, the primary light receiving lens 6, the photodetector protection assembly 7, the light collimator 9, the light converging lens 10 and the photodetector 11 are arranged on a reflecting light path of the light-plane reflecting mirror 5 with a central opening in turn. A light echo reflected by the light-plane reflecting mirror 5 with a central opening enters the primary light receiving lens 6, and enters the photodetector 11 through the light collimator 9 and the light converging lens 10 after being attenuated or occluded by the photodetector protection assembly 7. The photodetector protection assembly 7 is driven by the second motor 8, and the second motor 8 can be configured to rotate in the same direction and synchronously with the first motor 3, such that the photodetector protection assembly 7 also just rotate to an area with a light attenuation value of 0 or an occlusion-free area when the scanning beam is in the position ranges of 0°-X° and (360-X)°-360°, while the scanning beam in the position range of X°-(360-X°) is attenuated or occluded by the photodetector protection assembly 7.

Figure 3A:
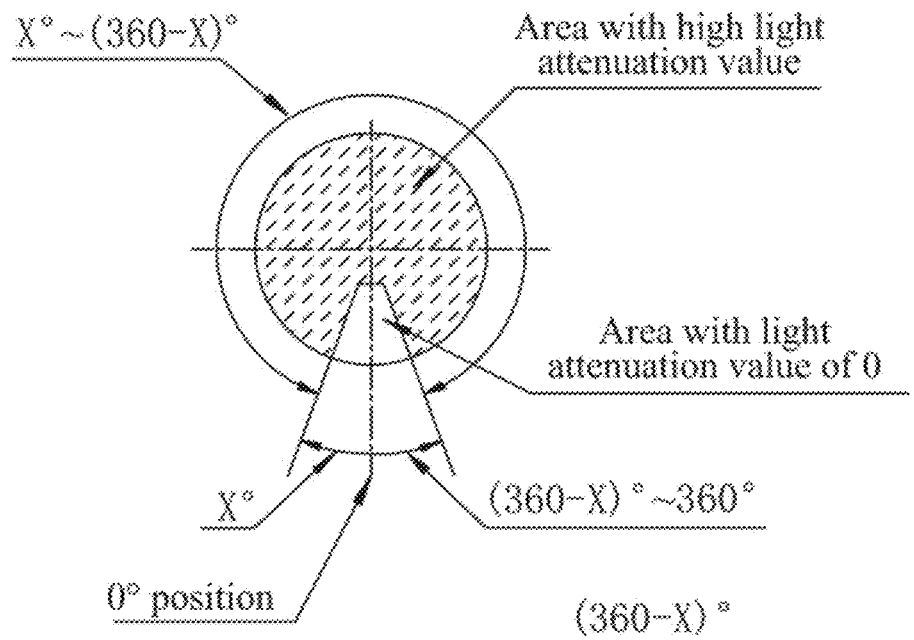
FIG. 3A is a structural diagram of a circular light attenuation sheet according to the present disclosure.
Figure 3B:
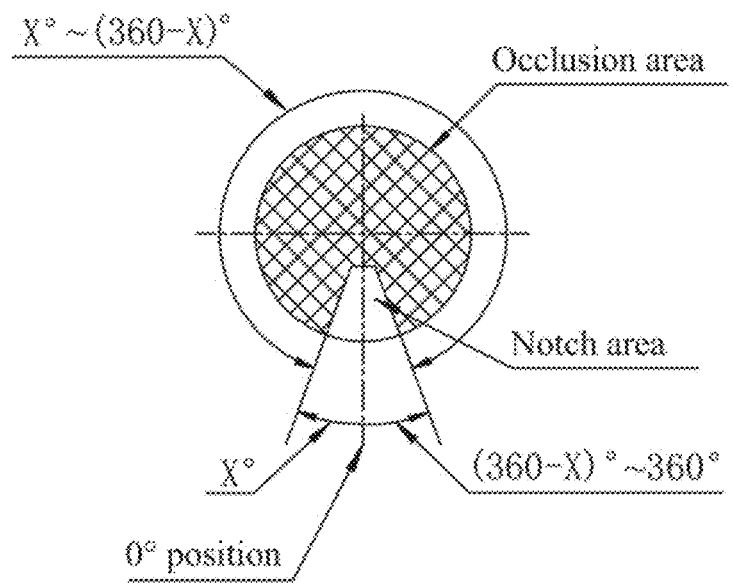
FIG. 3B is a structural diagram of a notched circular blocking sheet according to the present disclosure.

The structure of the photodetector protection assembly 7 is shown in FIGS. 3A-3B, in which FIG. 3A shows a structure of the circular light attenuation sheet. In the circular light attenuation sheet, areas corresponding to the position ranges of 0°-X° and (360-X)°-360° of the scanning beams are zero value light attenuation areas, in which the light attenuation value is 0; and an area corresponding to the position range of X°-(360-X) ° of the scanning beams is a high-value light attenuation area, in which the light attenuation value is 60 dB, i.e., $10^6$ times attenuation. In some embodiments, the circular light attenuation sheet may be achieved by coating a lens with a film.

FIG. 3B shows a structure of a notched circular blocking sheet. In the notched circular blocking sheet, areas corresponding to the position ranges of 0°-X° and (360-X)°-360° of the scanning beam are occlusion-free areas (i.e., the notch area), and an area corresponding to the position range of X°-(360-X) ° of the scanning beam is occluded by the circular blocking sheet (i.e., the occlusion area). In some embodiments, the notched circular blocking sheet employs a notched circular metal extinction sheet.

As shown in FIG. 1, a circular light attenuation sheet or a notched circular blocking sheet 7 is added in front of a photosensitive surface window of the photodetector 11, which is driven by the second motor 8. The laser 1 emits a pulsed laser beam, and the incident laser beam passes through the light-plane reflecting mirror 5 with a central opening, and pass through the light-plane reflecting rotating mirror 2 (which is driven by the first motor 3 to rotate around the optical axis of the incident laser beam) to form an inline light spot linear scanning trajectory downward. The light echoes from the water surface and the water bottom pass through the light-plane reflecting rotating mirror 2 upwards, through the light-plane reflecting rotating mirror 5 with a central opening, and into the primary light receiving lens 6, and then pass through the photodetector protection assembly 7 (which is driven by the second motor 8), the light collimator 9, and the light converging lens 10, and finally into the photodetector 11.

In some preferred embodiments, if X=20, the second motor 8 and the first motor 3 are driven synchronously in the same direction. When the incident laser beam completes a 360° light spot scanning process by the rotation of the light-plane reflecting rotating mirror 2, and the scanning beam is in the position ranges of 0°-20° and 340°-360°, the circular light attenuation sheet also just rotates to a position range with a light attenuation value of 0 (or a notch of the circular blocking sheet is just in this position range), thus ensuring that the light echoes (from water surface and water bottom) generated by the scanning beam in this range enter the photodetector 11 without attenuation, while the scanning beam in the range of 20°-340° is occluded by the notched circular annular shield 4, and the stray light generated by occlusion cannot enter the photodetector 11 due to attenuation of the circular light attenuation sheet or the occlusion of an unnotched part of the circular blocking sheet.

The LiDAR emits pulsed laser by the laser 1, the pulsed laser reaches downwards to the water surface through the light scanning device of the present disclosure, part of the pulsed laser passes through the water body to reach the water bottom. When the pulse laser echoes reflected from the water surface and the water bottom are received by the LiDAR, an internal controller records three data, such as reference time when the pulsed laser is emitted, return time from the water surface and the return time from the water bottom. A depth of the water body (i.e., water depth) can be calculated by measuring round-trip time of the laser pulse.

Compared with the existing light scanning technology, the laser scanning device adopts a protection combination mode of an in-line light (reflection) scanning assembly and the light receiving assembly, and the specific advantages are as follows:

(1) The circular light-plane reflecting rotating mirror 2 is relatively thin and keeps rotating in the same direction all the time during operation of the LiDAR (the first motor 3 can be set clockwise or counterclockwise), and the first motor 3 may be a small motor, so the light scanning assembly is light in weight and small in volume. The circular light-plane reflecting rotating mirror 2 (in axisymmetric installation) has small rotational inertia, so the first motor 3 can drive the circular light-plane reflecting rotating mirror 2 to rotate faster, making the light scanning faster.

(2) The circular light attenuation sheet or notched circular blocking sheet in the photodetector protection assembly 7 is relatively light and thin, and keeps rotating in the same direction all the time during the operation of the LiDAR (the second motor 8 may be set to rotate in the same direction and synchronously with the first motor 3), and the second motor 8 may be a small motor, so the photodetector protection assembly 7 is light in weight and small in volume. The circular light attenuation sheet or the notched circuit blocking sheet (in axisymmetric installation) has small rotational inertia, so the rotating speed is faster, and the light scanning speed is faster.

(3) A mechanical structure design and processing of the light scanning assembly are simple, and the technological process of installing and debugging the light scanning assembly together with other optical assemblies is less difficult.

(4) An optical route for light scanning and light echo receiving is simple, and there are less error factors that may affect the measurement results. The later data processing can avoid more complicated algorithms, and the related program software is simplified, which makes the data processing running relatively fast.

(5) An echo signal from the water bottom is weaker than an echo signal from the water surface by more than 3-4 orders of magnitude. In order to receive the echo from the water bottom as much as possible to improve the water depth measurement range, the LiDAR usually chooses the laser 1 with higher peak output power to emit pulsed laser to make up for the light absorption and light scattering of the water body, and chooses a high-sensitivity photodetector 11 at the same time to enhance the detection of the weak light echo from the water bottom. The laser scanning device, by employing a mode of synchronous optical scanning of double motors+light attenuation (or light occlusion), can eliminate the interference and damage of shield light, stray light and other light echoes which are not from the water bottom on the photodetector as much as possible, greatly improve the detection accuracy, and is particularly suitable for water depth measurement.

(6) A structural design of the light scanning assembly and the light receiving assembly can reduce the overall weight and volume of the laser scanning device, which is beneficial to the lightweight and miniaturization of the whole LiDAR machine and convenient for customers to choose, use and operate various commercial hanging wing UAV platforms in the market. Certainly, the LiDAR and the laser scanning device provided by the present disclosure may also be borne on other manned or unmanned platforms for use.

In an exemplary embodiment, the present disclosure further provides an UAV-borne LiDAR for water depth measurement, including a controller, and the laser scanning device. The laser scanning device includes a light scanning assembly (including a light-plane reflecting rotating mirror 2, a first motor 3, and notched annular shield 4), and a light receiving assembly (including a light-plane reflecting mirror 5 with a central opening, a primary light receiving lens 6, a photodetector protection assembly 7, a second motor 8, a light collimator 9, and a light converging lens 10). As shown in FIG. 1, a laser beam output by the laser 1 passes through the light-plane reflecting rotating mirror 5 with a central opening to form an in-line linear light (reflecting) scanning beam downwards through the light scanning assembly (downwards from a bottom window of the product), thus completing the light scanning of the water surface and the water bottom below. The light echoes returned from the water surface and the water bottom below pass through the light-plane reflecting rotating mirror 2 and the light-plane reflecting mirror 5 with a central opening, enter the primary light receiving lens 6, the photodetector protection assembly 7, the light collimator 9 and the light converging lens 10 of the light receiving assembly in turn, and finally enter the photodetector 11. The photodetector protection assembly 7 is placed at a focal position of the primary light receiving lens 6 and the light collimator 9, and the photodetector protection assembly 7 may employ a circular light attenuation sheet, or a notched circular metal extinction sheet. In a preferred embodiment shown in FIGS. 3A-3B, the circular light attenuation sheet is arranged as follows: in the position ranges of 0°-20° and 340°-360°, the light attenuation value of 0; and in the range of 20°-340°, the light attenuation value is 60 dB (i.e., $10^6$ times attenuation). The notched circular metal extinction sheet is arranged as follows: there is a notch in the position ranges of 0°-20° and 340°-360°, and there is no notch in the range of 20°-340°. The second motor 8 and the first motor 3 are synchronously driven in the same direction to ensure that only the light echoes (from the water surface and water bottom) of the scanning beams in the range of 0°-20° and 340°-360° can enter the photodetector 11 without attenuation.

The controller is connected to the laser device 1, the first motor 3, the second motor 8 and the photodetector 11 in the laser scanning device. The controller is configured to control light power of a laser beam emitted by the laser 1, and to control synchronous rotation of the first motor 3 and the second motor 8 in the same direction. The controller is also configured to record reference time when the laser beam is emitted and return time of light echoes from a water surface and a water bottom, and to calculate a depth of a water body according to the reference time and the return time.

In an exemplary embodiment, the present disclosure provides an UAV, where an UAV-borne LiDAR for water depth measurement is borne on the UAV. The LiDAR includes a laser scanning device, and a structural design of the light scanning assembly and the light receiving assembly can reduce the overall weight and volume of the laser scanning device, which is beneficial to the lightweight and miniaturization of the whole LiDAR machine and convenient for customers to choose, use and operate various commercial hanging wing UAV platforms in the market.

Various technical features of the above embodiments can be combined at will. In order to make the description concise, not all possible combinations of the technical features in the above embodiments are described. However, it should be considered that these combinations of technical features fall within the scope recorded in this specification provided that these combinations of technical features do not have any conflict.

Specific examples are used herein for illustration of the principles and embodiments of the present disclosure. The description of the embodiments is merely used to help illustrate the method and its core principles of the present disclosure. In addition, a person of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A laser scanning device of an unmanned aerial vehicle (UAV)-borne Light laser detection and ranging (LiDAR) for water depth measurement, comprising:
    a laser configured to emit a laser beam, wherein a direction of the laser beam emitted is parallel to a flight direction of a UAV;
    a light scanning assembly, comprising:
        a light-plane reflecting rotating mirror;
        a first motor, wherein the light-plane reflecting rotating mirror is driven by the first motor to rotate clockwise or counterclockwise by 360° around an optical axis of an incident laser beam base on 0° rotation position, such that the incident laser beam forms 360° light spot linear scanning in an X-Z plane; and
        a notched annular shield mounted around the light-plane reflecting rotating mirror and being arranged with a notch being downwards, wherein the notch has area ranges of 0°-X° and (360-X)°-360°, the notched annular shield is configured to occlude scanning beams in a position range of X°-(360-X)°, and only scanning beams in position ranges of 0°-X and (360-X)°-360° pass downwards through the notch of the notched annular shield to form an in-line linear scanning trajectory, and wherein X is greater than or equal to 5 and less than or equal to 25;
    a light receiving assembly, comprising:
        a light-plane reflecting mirror with a central opening, wherein
            the light-plane reflecting mirror with the central opening and the light-plane reflecting rotating mirror are located on an emitting light path of the laser in turn and placed at a predetermined included angle with respect to the optical axis of the incident laser beam, the laser beam emitted by the laser passes through the central opening, is directly incident on the light-plane reflecting rotating mirror, and is reflected downward by the light-plane reflecting rotating mirror to form scanning beams; and an XYZ coordinate system is established with the flight direction of the UAV as Y-axis direction and a horizontal plane as an X-Y plane, and a position where the scanning beams are parallel to a Z axis is used as a 0° rotation position; and
            the scanning beams outgoing through the notch of the notched annular shield reaches a water surface downwards, and part of the scanning beams passes through a water body to reach a water bottom; and light echoes reflected from the water surface and the water bottom are transmitted upward to the light-plane reflecting rotating mirror, reflected by the light-plane reflecting rotating mirror to the light-place reflecting mirror with the central opening, and then reflected by the light-plane plane reflecting mirror with the central opening;
        a primary light receiving lens;
        a photodetector protection assembly being a circular light attenuation sheet or a notched circular blocking sheet;
        a second motor;
        a light collimator; and
        a light converging lens; and
    a photodetector;
    wherein the primary light receiving lens, the photodetector protection assembly, the light collimator, the light converging lens and the photodetector are arranged on a reflecting light path of the light-plane reflecting mirror with the central opening in turn; a light echo reflected by the light-plane reflecting mirror with the central opening enters the primary light receiving lens, and enters the photodetector through the light collimator and the light converging lens after being attenuated or occluded by the photodetector protection assembly;
    the photodetector protection assembly is driven by the second motor, and the second motor and the first motor are synchronously driven, such that the photodetector protection assembly also just rotate to an area with a light attenuation value of 0 or an occlusion-free area when the scanning beams are in the position ranges of 0°-X° and (360-X)°-360°, and the scanning beams in the position range of X°-(360-X°) are occluded by the notched annular shield, and stray light generated by occlusion is unable to enter the photodetector due to attenuation or occlusion of the photodetector protection assembly.

2. The laser scanning device according to claim 1, wherein the predetermined included angle between the light-plane reflecting mirror with the central opening as well as the light-plane reflecting rotating mirror and the optical axis of the incident laser beam is 45°.

3. The laser scanning device according to claim 1, wherein the light-plane reflecting rotating mirror is circular.

4. The laser scanning device according to claim 1, wherein the first motor is coaxial with the incident laser beam.

5. The laser scanning device according to claim 1, wherein the second motor and the first motor are configured to drive the photodetector protection assembly and the light-plane reflecting rotating mirror respectively to synchronously rotate in a same direction.

6. The laser scanning device according to claim 1, wherein in the circular light attenuation sheet, areas corresponding to the position ranges of 0°-X° and (360-X)°-360° of the scanning beams are zero value light attenuation areas, in which the light attenuation value is 0; and an area corresponding to the position range of X°-(360-X°) of the scanning beams is a high-value light attenuation area, in which the light attenuation value is 60 dB.

7. The laser scanning device according to claim 1, wherein in the notched circular blocking sheet, areas corresponding to the position ranges of 0°-X° and (360-X)°-360° of the scanning beams are occlusion-free areas, and an area corresponding to the position range of X°-(360-X°) of the scanning beams is occluded by the notched circular blocking sheet.

8. The laser scanning device according to claim 7, wherein the notched circular blocking sheet employs a notched circular metal extinction sheet.

9. A UAV-borne LiDAR for water depth measurement, comprising:
a controller, and
the laser scanning device according to claim 1,
wherein the controller is connected to the laser, the first motor, the second motor, and the photodetector in the laser scanning device and is configured to control optical power of the laser beam emitted by the laser, and to drive the first motor and the second motor to move synchronously, the controller being further configured to record a reference time when the laser beam is emitted and a return time of light echoes from the water surface and the water bottom, and to calculate a depth of the water body according to the reference time and the return time.

10. The UAV-borne LiDAR according to claim 9, wherein the predetermined included angle between the light-plane reflecting mirror with the central opening as well as the light-plane reflecting rotating mirror and the optical axis of the incident laser beam is 45°.

11. The UAV-borne LiDAR according to claim 9, wherein the light-plane reflecting rotating mirror is circular.

12. The UAV-borne LiDAR according to claim 9, wherein the first motor is coaxial with the incident laser beam.

13. The UAV-borne LiDAR according to claim 9, wherein the second motor and the first motor are configured to drive the photodetector protection assembly and the light-plane reflecting rotating mirror respectively to synchronously rotate in a same direction.

14. The UAV-borne LiDAR according to claim 9, wherein in the circular light attenuation sheet, areas corresponding to the position ranges of 0°-X° and (360-X)°-360° of the scanning beams are zero value light attenuation areas, in which the light attenuation value is 0; and an area corresponding to the position range of X°-(360-X°) of the scanning beams is a high-value light attenuation area, in which the light attenuation value is 60 dB.

15. The UAV-borne LiDAR according to claim 9, wherein in the notched circular blocking sheet, areas corresponding to the position ranges of 0°-X° and (360-X)°-360° of the scanning beams are occlusion-free areas, and an area corresponding to the position range of X°-(360-X) ° of the scanning beams is occluded by the notched circular blocking sheet.

16. The UAV-borne LiDAR according to claim 15, wherein the notched circular blocking sheet employs a notched circular metal extinction sheet.

17. A UAV, wherein the UAV-borne LiDAR for water depth measurement according to claim 9 is borne on the UAV.

* * * * *